United States Patent [19]

Vaidyanathan

[11] 4,304,828

[45] Dec. 8, 1981

[54] ZINC ELECTRODE

[75] Inventor: Hariharan Vaidyanathan, Danbury, Conn.

[73] Assignee: Energy Research Corporation, Danbury, Conn.

[21] Appl. No.: 163,935

[22] Filed: Jun. 27, 1980

[51] Int. Cl.³ ............... H01M 4/02; H01M 10/24
[52] U.S. Cl. ............................ 429/206; 429/229; 429/231; 429/232
[58] Field of Search ................ 429/229–231, 429/206, 207, 218, 232; 252/520, 512

[56] References Cited

U.S. PATENT DOCUMENTS

| | | | |
|---|---|---|---|
| 1,139,213 | 5/1915 | Morrison | 429/230 |
| 3,623,911 | 11/1971 | Oswin | 429/229 X |
| 3,703,413 | 11/1972 | Arrance | 429/231 X |
| 3,749,605 | 7/1973 | Peters | 429/230 |
| 4,017,665 | 4/1977 | Sandera et al. | 429/229 |
| 4,041,221 | 8/1977 | Berchielli et al. | 429/229 X |
| 4,084,047 | 4/1978 | Himy et al. | 429/229 X |

Primary Examiner—Anthony Skapars

[57] ABSTRACT

A zinc electrode comprised of a zinc active material which includes an additive material selected from the group consisting of zinc fluoride and zinc titanate.

13 Claims, No Drawings

ZINC ELECTRODE

BACKGROUND OF THE INVENTION

This invention relates to secondary batteries, and, in particular, to secondary batteries employing zinc electrodes.

Conventional secondary batteries employing zinc electrodes such as, for example, silver-zinc and nickel-zinc alkaline batteries, exhibit a decline in cell capacity with continued cycling. This decline in cell capacity is attributable to the morphological changes, typically referred to as shape changes, which occur in the negative zinc battery electrode. The net effect of these shape changes is aggolomeration and densification of the zinc electrode with a consequent reduction in surface area available for electrochemical reaction.

Various attempts have been made to develop a zinc electrode exhibiting a high resistance to shape change. One technique that has been employed is to incorporate in the active material of the zinc electrode constituents such as calcium or magnesium hydroxide which react with the active material during discharge to form zincates which are substantially insoluble in the cell electrolyte. This technique is disclosed, for example, in U.S. Pat. No. 3,873,367. It has also been proposed to incorporate cadmium particulate matter in the zinc electrode for promoting adherence of electroreduced zinc active material or zinc deposited from the alkaline electrolyte. In this construction the cadmium matter is maintained electrochemically inert during discharge by selecting positive electrode active material to be electrochemically inactive prior to depletion of the zinc active material.

While the above techniques result in a measure of shape change reduction, investigations are still being conducted for alternative techniques.

It is an object of the present invention to provide a zinc electrode which is resistant to shape change.

It is a further object of the present invention to provide such an electrode in a manner which does not reduce battery energy density during use.

SUMMARY OF THE INVENTION

In accordance with the principles of the present invention, the above and other objects are realized in a zinc electrode construction wherein incorporated in the zinc electrode active material is a zinc additive material which is insoluble in the cell electrolyte and electrochemically active, the zinc additive being either zinc fluoride or zinc titanate. In preferred practice, when zinc fluoride is included in the active material the weight percent of zinc fluoride is equal to or less than about 30% of the total active material weight, while when zinc titanate is used the weight percent of titanate is equal to or less than about 20% of the total active material weight.

DETAILED DESCRIPTION

The present invention is based on the discovery that active, insoluble zinc titanate and zinc flouride when included as part of the zinc active material of a zinc alkaline battery electrode, inhibit shape change occurring during battery cycling and, therefore, promote battery life. This effect is believed to be due to the following.

The zinc active material (e.g., zinc oxide) customarily used in the zinc electrode of an alkaline battery is soluble in the battery electrolyte (typically, potassium hydroxide) and during discharge the zinc goes into solution as a zincate. On subsequent charging of the battery, the zinc in solution does not normally plate back at the same location from which it dissolved. Instead, it tends to plate back more at the electrode center, thereby causing electrode shape change.

With the addition of zinc titanate or zinc fluoride, both of which are insoluble in the cell electrolyte, to the usually soluble zinc active material, the zinc which goes into solution tends to plate back to the electrode areas from whence it came. It is believed that reduction of the additive material results in zinc deposits which establish centers for nucleation and growth of further zinc deposition from the dissolved active material (i.e., zincates). By uniformly distributing the additive material these nucleation sites will tend to be uniform, thereby reducing the tendency of the zincate to redeposit more toward the electrode center than its periphery.

While the additive materials of the present invention may be incorporated in varying amounts, it is preferable that the amount of zinc titanate be equal to or less than about 20 percent by weight of the total electrode active material and the amount of zinc fluoride to be equal to or less than about 30 percent by weight of the total electrode active material. With the present additives since they are active in the presence of the cell electrolyte, battery energy density is preserved.

EXAMPLE I

A nickel-zinc cell in the vented prismatic configuration was fabricated. The active core of the cell comprised an electrode sandwich in which were arranged a succession of assemblies, each assembly containing a positive electrode, a separator and a negative electrode. The cell contained a total of six positive electrodes and 5 full and 2 half negative electrodes. The positive electrodes were of the polymerbound type and contained nickel hydroxide dispersed in a polymer network. The negative electrodes were prepared by first blending 25 grams of active material containing 72% zinc oxide, 20% zinc fluoride, 4% cadmium oxide, 1% titanium dioxide, 1% lead monoxide and 2% Teflon. The blend was then mulled by repeatedly passing it through rollers and the active material formed into a sheet by calendering. Each negative electrode was formed by laminating two layers of this sheet onto both sides of a 0.002 inch thick piece of copper foil, the layered structure then being pressed.

The assembled cell was filled with an electrolyte composition consisting of 35% KOH and 1% LiOH. The cell was life cycle tested on a cycling regime consisting of charge at C/6 and discharge at C/2, C being the rated capacity in ampere hours. A control cell having a similar constitution, with the exception that the negative electrodes contained no zinc fluoride, was fabricated and similarly tested.

After 107 cycles both the cells were dissected and the zinc electrodes were analyzed to determine the extent of shape change. The shape change was compared for the cells in terms of area reduction. The zinc electrodes in the control cell exhibited an area reduction of 53% where as the zinc electrodes from the cell containing the zinc fluoride additive exhibited an area reduction of 26%. The experimental results show that the zinc electrodes containing the additive were twice as stable as these which contained no additive.

EXAMPLE II

A nickel-zinc cell in the vented, prismatic configuration was fabricated. The cell contained a similar core cell construction as in the previous example, i.e., a succession of assemblies each containing a positive electrode, a separator and a negative electrode. As in Example I, the positive electrodes were of a polymer bound type and contained nickel hydroxide dispersed in a polymer network. The negative electrodes were prepared by first blending 25 grams of the active material containing 80% zinc oxide, 10% zinc titanate, 7% cadmium oxide and 3% Teflon in Shell solvent. The product was then mulled by repeatedly passing it through rollers, and a continuous sheet of active material calendered out. Each electrode was then fabricated by laminating two layers of this sheet material onto both sides of a 0.002 inch thick piece of copper foil, the unit thereafter being densified by hydraulic pressing. The density of each negative electrode after pressing was about 2.5 gm/cubic centimeter. Each separator comprises a layer of polyamide felt and polyvinyl alcohol membrane.

The cell was filled with an electrolyte composition consisting of 30% KOH+1% LiOH and life cycle tested in a cycling regimen consisting of charge at C/6 and discharge at C/2. A control cell of similar construction but whose negative electrodes contained no zinc titanate was also fabricated and similarly cycle tested.

After cycling the cells were dissected and the zinc electrodes were analyzed to determine the extent of area reduction due to "shape change". After 151 cycles of charge and discharge, the zinc titanate containing cell exhibited an area reduction of only 24%, whereas the zinc electrodes from the control cell exhibited an area reduction of 53% after 107 cycles. The experimental results show that zinc electrodes containing zinc titanate have far better stability and consequently improved capacity maintenance over those containing no additive.

In all cases, it is understood that the above-described arrangements are merely illustrative of the many possible specific embodiments which represent applications of the present invention. Numerous and varied other arrangements can readily be devised in accordance with the principles of the present invention without departing from the spirit and scope of the invention.

What is claimed is:

1. A zinc electrode for use in a battery containing an alkaline electrolyte comprising:
   an active material including a first zinc material and a second zinc additive material, said first material being soluble in said electrolyte and having a weight percent which is greater than the weight percent of said second material, said second material being substantially insoluble in said electrolyte and being selected from the group consisting of zinc fluoride and zinc titanate.

2. An electrode in accordance with claim 1 wherein:
   said active material includes a binder.

3. An electrode in accordance with claim 4 wherein:
   said second material is zinc fluoride and is present in an amount of about 30 percent or less by weight of said active material.

4. An electrode in accordance with claim 2 wherein:
   said second material is zinc titanate and is present in an amount of about 20 percent or less by weight of said active material.

5. An electrode in accordance with claims 3 or 4 wherein:
   said first material is zinc oxide.

6. A battery for use with an alkaline electrolyte comprising:
   a first electrode;
   a second electrode containing an active material including a first zinc material and a second zinc additive material, said first material being soluble in said electrolyte and having a weight percent which is greater than the weight percent of said second material, said second material being substantially insoluble in said electrolyte and being selected from the group consisting of zinc titanate and zinc fluoride.

7. A battery in accordance with claim 6 further including:
   an alkaline electrolyte communicating with said first and second electrodes.

8. A battery in accordance with claim 7 wherein:
   said active material includes a binder.

9. A battery in accordance with claim 7 wherein:
   said second material is zinc fluoride and is present in an amount of about 30 percent or less by weight of said active material.

10. A battery in accordance with claim 7 wherein:
    said second material is zinc titanate and is present in an amount of about 20 percent or less.

11. A battery in accordance with claim 9 or 10 wherein:
    said alkaline electrolyte comprises potassium hydroxide.

12. A battery in accordance with claim 9 wherein:
    said alkaline electrolyte comprises about 35 percent potassium hydroxide.

13. A battery in accordance with claim 10 wherein:
    said alkaline electrolyte comprises about 30 percent potassium hydroxide.

* * * * *